(12) United States Patent
Le et al.

(10) Patent No.: US 7,904,223 B2
(45) Date of Patent: Mar. 8, 2011

(54) POST IMPACT SAFETY SYSTEM WITH VEHICLE CONTACT INFORMATION

(75) Inventors: Jialiang Le, Canton, MI (US); Manoharprasad K. Rao, Novi, MI (US); Clifford C. Chou, Farmington Hills, MI (US); Joseph Robert Brown, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 810 days.

(21) Appl. No.: 11/871,381

(22) Filed: Oct. 12, 2007

(65) Prior Publication Data

US 2009/0099734 A1 Apr. 16, 2009

(51) Int. Cl.
*B60R 21/01* (2006.01)
*G06F 19/00* (2006.01)
(52) U.S. Cl. ............. 701/46; 701/45; 280/735; 180/282
(58) Field of Classification Search ............... 701/45, 701/46; 280/730.2, 735; 180/282, 274; 73/862.59, 73/514.01
See application file for complete search history.

(56) References Cited

U.S. PATENT DOCUMENTS

| | | | |
|---|---|---|---|
| 5,338,062 A | 8/1994 | Kiuchi et al. | |
| 6,036,224 A | 3/2000 | Wächter et al. | |
| 6,099,031 A | 8/2000 | Bischoff | |
| 6,113,138 A | 9/2000 | Hermann et al. | |
| 6,530,597 B1 | 3/2003 | Nesper et al. | |
| 6,540,255 B1 | 4/2003 | Blank et al. | |
| 6,636,794 B2 * | 10/2003 | Yamashita | 701/46 |
| 6,898,498 B1 | 5/2005 | Wessels et al. | |
| 6,929,282 B1 | 8/2005 | Zoratti et al. | |
| 7,206,678 B2 | 4/2007 | Arduc et al. | |
| 2002/0027339 A1 * | 3/2002 | Breed | 280/730.2 |
| 2004/0061598 A1 | 4/2004 | King | |
| 2005/0055146 A1 | 3/2005 | Ide | |

FOREIGN PATENT DOCUMENTS

| | | |
|---|---|---|
| DE | 10337620 A1 | 3/2005 |
| DE | 102004007849 A1 | 9/2005 |
| EP | 1659006 A2 | 5/2006 |
| EP | 2036795 A1 | 3/2009 |
| WO | 2005047066 A1 | 5/2005 |

OTHER PUBLICATIONS

European Search Report for corresponding Application No. 08163114.5, mailed Apr. 16, 2010, 7 pages.
Chinese Office Action for corresponding Application No. 200810149264.8, issued Sep. 8, 2010, 9 pages.

* cited by examiner

*Primary Examiner* — Tan Q Nguyen
(74) *Attorney, Agent, or Firm* — Frank A. MacKenzie; Brooks Kushman P.C.

(57) ABSTRACT

A system for providing post-impact signals in a vehicle is provided. The vehicle includes at least one impact zone with a passive safety sensor positioned at designated sections of the vehicle. The system comprises a plurality of passive safety sensors, a passive safety controller, and an active safety controller. The passive safety controller determines the impact location, impact direction and intensity. The passive safety controller transmits a passive output signal indicative of the impact intensity, impact direction and impact location. The active safety controller stabilizes the vehicle post-impact in response to the passive output signal.

20 Claims, 3 Drawing Sheets

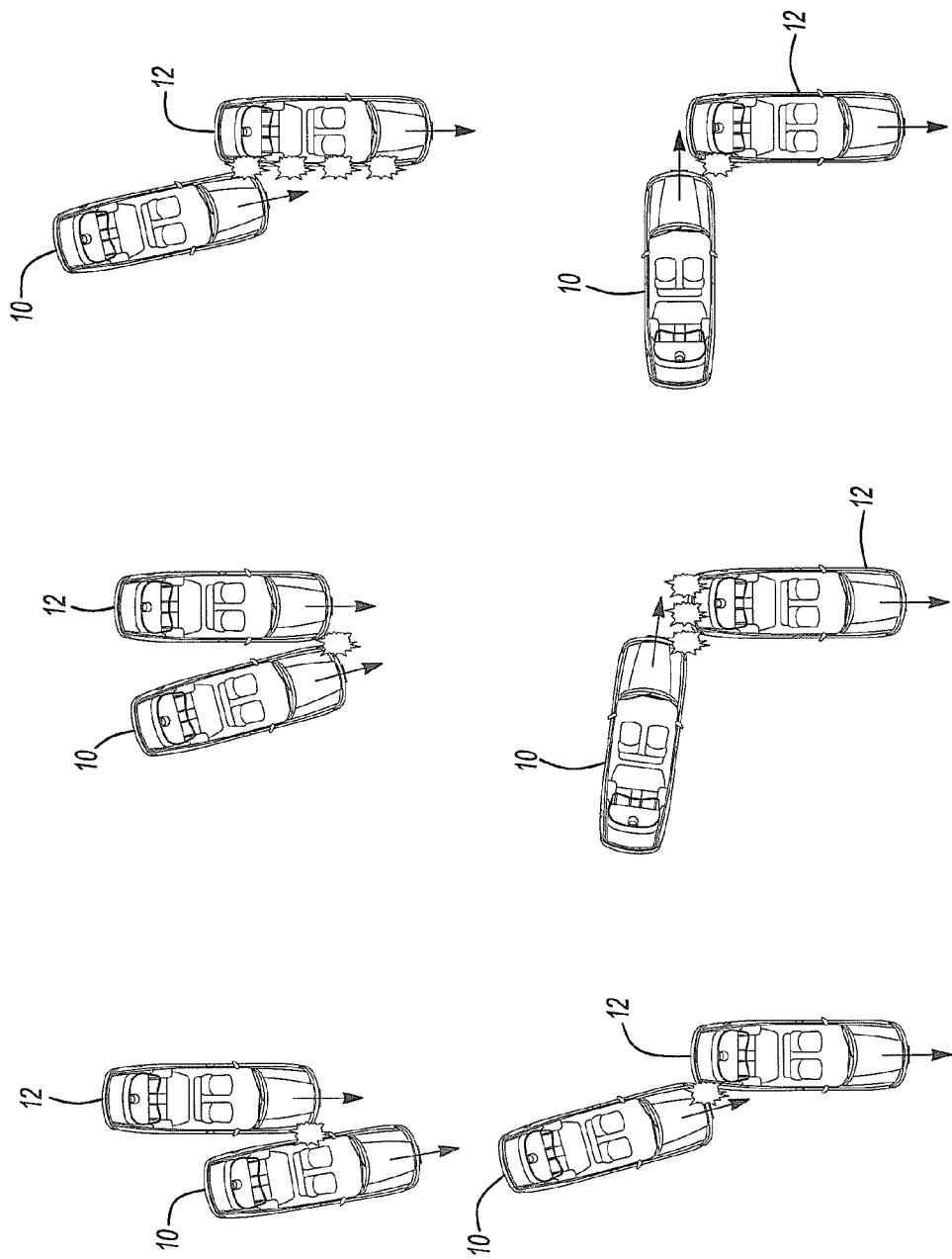

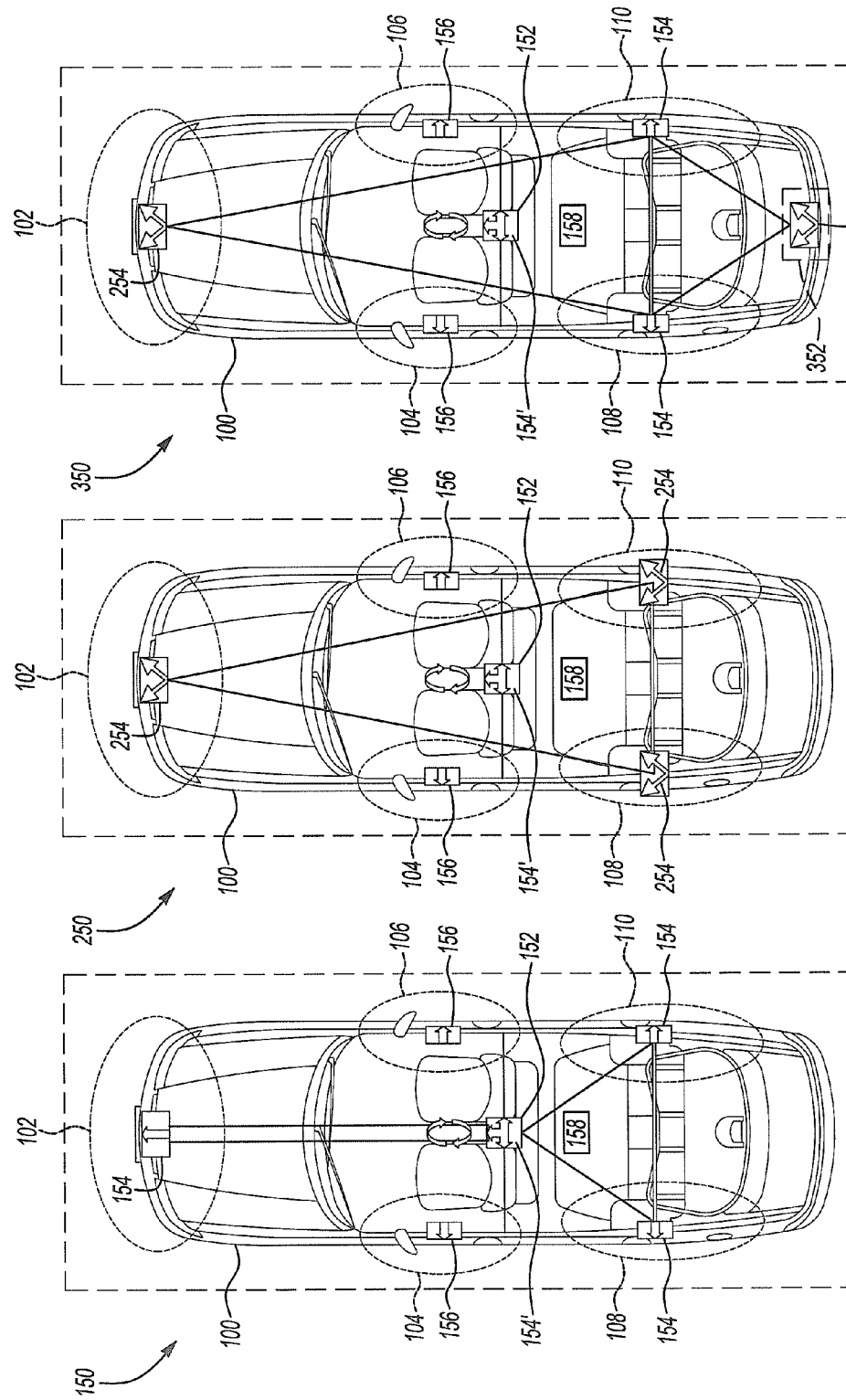

POST IMPACT SAFETY SYSTEM WITH VEHICLE CONTACT INFORMATION

BACKGROUND

1. Technical Field

The embodiments of the present invention described herein generally relate to a system and method for post impact safety using vehicle contact information.

2. Background Art

FIG. 1 depicts various light impact scenarios that may take place between a moving vehicle 10 and a host vehicle 12. The moving vehicle 10 contacts the host vehicle 12 causing the host vehicle 12 to operate under a post-contact situation. While in the post-contact situation, the host vehicle 12 may be in an unstable state. Pre-crash sensing systems utilize radar and vision sensors for active safety applications. The active safety applications generally provide information related to the state of the host vehicle 12 and the state of any oncoming objects or vehicle(s) with respect to the host vehicle 12 prior to contact. The active safety applications employ vehicle countermeasures such as braking and steering to mitigate or avoid impact. Real world accident data has shown, that in some situations, a vehicle may lose control even when the vehicle experiences a light impact, which in some cases may not be sever enough to deploy the restraint system.

Accordingly, it would be desirable to provide a system and a method for enhancing vehicle safety by providing vehicle contact information to an active safety application when the vehicle experiences impacts, including light impacts to stabilize the vehicle post impact.

SUMMARY

In one embodiment, a system for providing post-impact signals in a vehicle is provided. The vehicle includes at least one impact zone with a passive safety sensor positioned at designated sections of the vehicle. At least one passive safety sensor is positioned in each impact zone and adapted to detect vehicle impact and direction of an oncoming object. The passive safety sensor is configured to generate a passive input signal or a passive input signal set. The system also includes a passive safety controller having a reference passive safety sensor for generating a reference signal. The passive safety controller is adapted to determine the impact location, direction and intensity based on the reference signal and the passive input signal or the passive input signal set. An active controller is adapted to stabilize the vehicle post-impact based on the impact location, direction and intensity.

BRIEF DESCRIPTION OF THE DRAWINGS

FIG. 1 illustrates various light impact scenarios between vehicles;

FIG. 2 illustrates a system for sensing the location of vehicle impact and impact direction;

FIG. 3 illustrates another system for sensing the location of vehicle impact and impact direction;

FIG. 4 illustrates another system for sensing the location of the vehicle impact and impact direction.

DETAILED DESCRIPTION OF THE PREFERRED EMBODIMENT(S)

Figure 5:
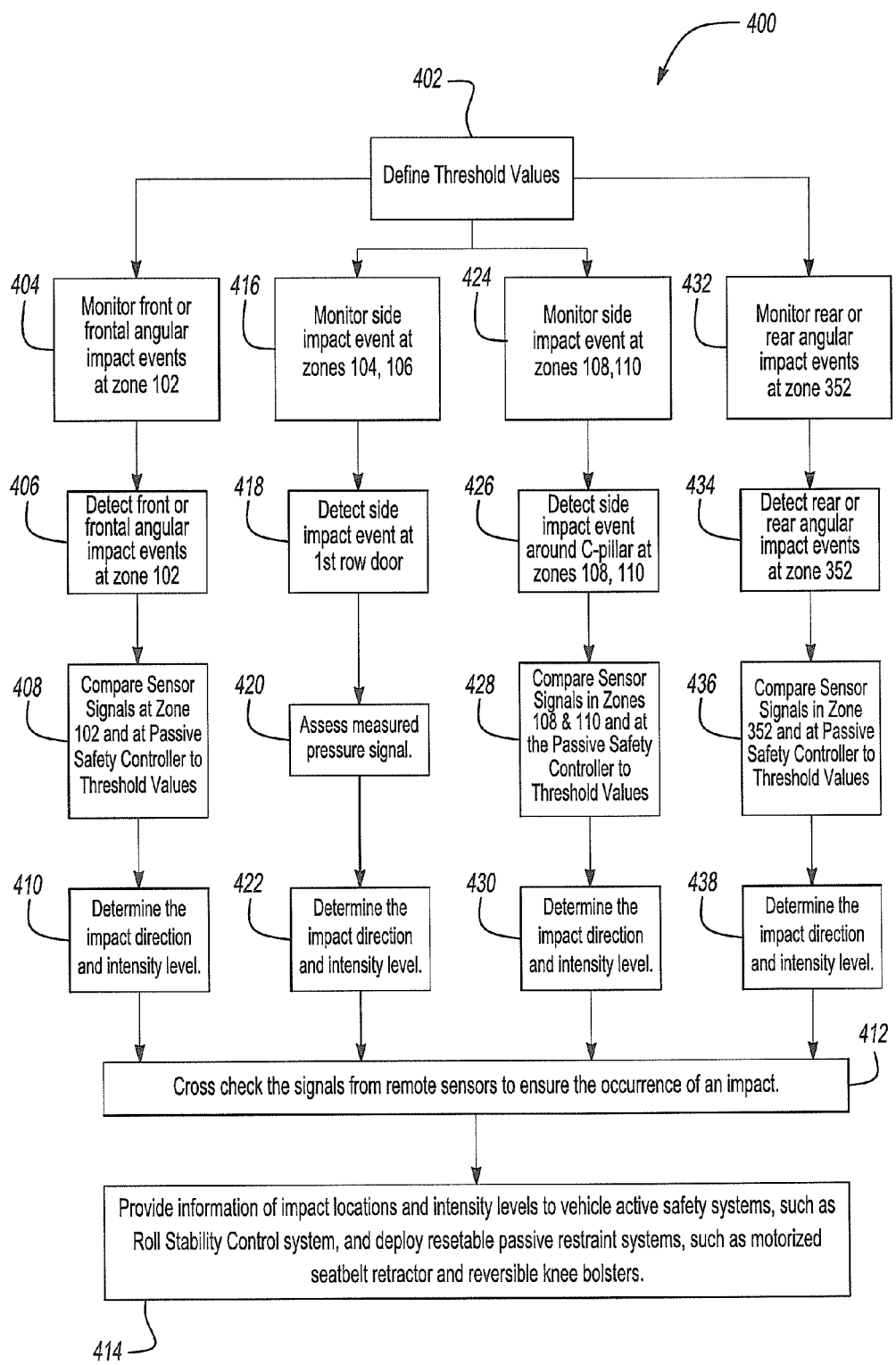
FIG. 5 illustrates a method for sensing the location of vehicle impact and impact direction.

FIG. 2 depicts a vehicle 100 having a system 150 for sensing impact location and impact direction of an oncoming object with respect to the vehicle 100 in accordance to one embodiment of the present invention. The vehicle 100 may be divided into various impact zones 102, 104, 106, 108 and 110. One or more zones 102, 104, 106, 108 and 110 may experience an impact from an oncoming object. Zone 102 generally includes a front section of the vehicle 100. Zone 104 generally includes a front driver section of the vehicle 100. Zone 106 generally includes a front passenger section of the vehicle 100. Zone 108 generally includes a left side rear passenger section of the vehicle 100. Zone 110 generally includes a right side rear passenger section of the vehicle 100. The system 150 comprises a passive safety controller 152 and a plurality of passive safety sensors. The passive safety controller 152 is positioned in the center of the vehicle 100 between zones 104 and 106.

The passive safety sensors generally comprise an accelerometer sensor 154 and a pressure sensor 156. The accelerometer sensor 154 is coupled to a structural member of the vehicle 100 and is configured to measure the movement of the structural member in the event the vehicle 100 encounters an impact. The pressure sensor 156 is positioned in door well cavities and measures a pressure change in the cavity. Such a pressure change in the door cavity of the vehicle 100 may be caused by the vehicle 100 experiencing an impact.

Zones 102, 104, 106, 108 and 110 of the vehicle 100 may be adapted to include any configuration of accelerometer or pressure sensors 154, 156. With reference to FIG. 2, zones 102, 108 and 110 each include the accelerometer sensor 154. In zone 102, for example, the accelerometer sensor 154 may be positioned near a radiator support (not shown). The accelerometer sensor 154 measures the movement of the radiator support in the event zone 102 experiences an impact. In zones 108 and 110, the accelerometer sensors 154 may be positioned to a structural member of the vehicle such as a rocker. The rocker is positioned on both sides of vehicle 100 between A, B and C pillars of the vehicle 100. The accelerometer sensors 154 positioned in zones 108 and 110 measures the movement of the rocker in the event either or both zones 108 and 110 experience an impact. An accelerometer sensor 154' may be integrated with the passive safety controller 152.

The accelerometer sensors 154 positioned in zones 102, 108 and 110 and the accelerometer sensor 154' positioned within the passive safety controller 152 are each adapted to transmit a first passive signal to the passive safety controller 152 in response to detecting a movement of the corresponding structural members due to the vehicle 100 experiencing an impact. The passive safety controller 152 may activate a restraint system (e.g., deploy airbags, seat belt restraints, or other such restraints) in response to the first passive signal if predetermined crash criteria are met. The first passive signal generated by the accelerometer sensor 154 in zones 102, 108 and 110 generally provides the impact direction of the oncoming object with respect to the vehicle 100 when impact occurred. The passive safety controller 152 determines impact location based on which accelerometer sensor 154 in zones 102, 108 and 110 is the first to transmit the first passive signal during vehicle impact. During vehicle impact, the passive safety controller 152 monitors the first passive signal transmitted by the accelerometer sensor 154 in each zone 102, 108 and 110 and the first passive signal generated by the accelerometer sensor 154'. The passive safety controller 152 monitors for vehicle acceleration and/or deceleration based on the first passive signal transmitted by the accelerometer sensor 154 and the accelerometer sensor 154' prior to deploying airbags or other such related safety features in the restraint system.

The passive safety controller 152 determines the direction of the oncoming object based on information provided by the accelerometer sensor 154 in the event a collision takes place. For example, if the passive safety controller 152 receives the first passive signal from the accelerometer sensor 154 in zone 102 at an earlier point in time with respect to the other accelerometer sensors in zones 108 and 110, the passive safety controller 152 determines that the impact direction of the oncoming object that collides with the vehicle 100 is longitudinal (e.g., x-axis of the vehicle 100 which is defined as the axis extending between the fore and aft portions of the vehicle). If the passive safety controller 152 receives the first passive signal at an earlier point in time (with respect to zone 102) from either or both of the accelerometer sensors 154 in zones 108 or 110, the passive safety controller 152 determines that the impact direction of the oncoming object that collides with the vehicle 100 is lateral (e.g., y-axis of the vehicle 100 which is defined as the axis extending from the passenger's side of the vehicle to the driver's side of the vehicle). The accelerometer sensor 154' integrated with the passive safety controller 152 provides a reference signal having reference accelerator values for comparison to the first passive signals received from the accelerometer sensors 154 positioned in zones 102, 108, and 110 to assess the intensity levels of the impact and to determine when it may be necessary to deploy various safety related features in the restraint system. The intensity level and reference signals will be discussed in more detail in connection with FIG. 5.

As also shown in FIG. 2, zones 104 and 106 each include the pressure sensor 156. The pressure sensor 156 in zones 104, 106 may each transmit a second passive signal to the passive safety controller 152 based on which zone 104, 106 experiences the impact. The second passive signal generated by the pressure sensor 156 in zones 104, 106 generally provide the impact direction of the oncoming object with respect to the vehicle 100 when impact occurred. The passive safety controller 152 determines impact location based on which pressure sensor 156 in zones 104, 106 transmits the stronger of the second passive signal during vehicle impact.

The passive safety controller 152 determines the direction of the oncoming object based on information provided by the pressure sensor 156 in the event a collision takes place. If the passive safety controller 152 receives the second passive signal from the pressure sensors 156 in zones 104 or 106, the passive safety controller 152 may determine that the impact location is at zones 104 or 106 and the impact direction of the oncoming object that collides with the vehicle 100 is lateral (e.g., y-axis of the vehicle). In general, the pressure sensors 156 positioned in zones 104 and 106 provide the location of the impact and the direction of the oncoming vehicle or object that collides with the vehicle 100. The passive safety controller 152 also monitors vehicle acceleration or deceleration via the accelerometer sensor 154', in the event the vehicle sustains an impact in either or both zones 104 and/or 106 prior to deploying airbags or other such related features in the restraint system. If the passive safety controller 152 receives a strong second passive signal from both or either of the pressure sensors 156 in zones 104 and 106 and detects that the acceleration/deceleration of the vehicle is greater than the reference signal, the passive safety controller 152 may deploy the airbags or other such related features in the restraint system.

The system 150 comprises an active safety controller 158. The active safety controller 158 is generally positioned close to the passive safety controller 152. The active safety controller 158 is configured to assess dynamic conditions for the vehicle 100 and predict impact between the vehicle 100 and the oncoming object. The active safety controller 158 may also employ various countermeasures to prevent or mitigate impact (or collisions) with other objects. In one example, the active safety controller 158 may be used in connection with roll and yaw stability systems (not shown) to assist in stabilizing the movement and direction of the vehicle 100 during the post-impact phase.

The active safety controller 158 stabilizes the movement and direction of the vehicle 100 even if the impact between the vehicle 100 and the oncoming object is light. With a light impact situation, the passive safety controller 152 may not deploy airbags but the active safety controller 158 may control the movement and direction of the vehicle into a stabilized state after impact. During a light impaction situation, the active safety controller 158 may not detect impact location, direction and intensity level. The active safety controller 158 may control the vehicle post impact based on the impact location, direction and intensity level transmitted by the passive safety controller 152.

Table 1 illustrates the impact location and direction that may be detected by the passive safety controller 152 and transmitted to the active safety controller 158 for the system 150.

TABLE 1

| Impact Location (Zone) | Impact Direction |
|---|---|
| 102 | longitudinal |
| 104 | lateral |
| 106 | lateral |
| 108 | lateral |
| 110 | lateral |

The accelerometer sensor 154 and the pressure sensor 156 transmit data with respect to the impact direction of the oncoming object to the passive safety controller 152. The passive safety controller 152 processes the data, determines the impact location and direction, and transmits the impact location and the direction over a multiplexed data bus (not shown) to the active safety controller 158. The passive safety controller 152 also determines the intensity level of the impact and transmits the intensity level over the multiplexed data bus to the active safety controller 158. The passive safety controller 152 transmits the impact location, impact direction and the intensity level as a passive output signal to the active safety controller 158. The active safety controller 158 may control the vehicle to a stabilized state after the vehicle 100 has encountered an impact in response to the passive output signal.

FIG. 3 depicts the vehicle 100 having a system 250 for sensing the impact location and the direction of the vehicle impact in accordance to another embodiment of the present invention. As noted in connection with FIG. 2, the vehicle 100 may be divided into various impact zones 102, 104, 106, 108 and 110. One or more zones 102, 104, 106, 108 and 110 may experience an impact from an oncoming vehicle or object.

The system 250 further includes a bi-axial accelerometer 254 positioned in zones 102, 108 and 110 which exhibit a 45° alignment with respect to vehicle longitudinal axis. Each bi-axial accelerometer 254 is configured to transmit a first passive signal set. The first passive signal set generally includes two accelerometer components (e.g., lateral and longitudinal) in mutually perpendicular directions (e.g., lateral and longitudinal). The bi-axial accelerometers 254 may provide more information than the accelerometer sensor 154 as used in the system 150. For example, the bi-axial accelerometer 254 may be able to detect that the impact direction of the oncoming object is either longitudinal or lateral for each zone 102, 108 and 110.

The passive safety controller 152 detects the impact location based on which bi-axial accelerometer 254 is the first to transmit the first passive signal set at the time of impact. The passive safety controller 152 determines the impact direction in response to the first passive signal set. The impact direction of the oncoming object in zones 102, 108 and 110 may be longitudinal or lateral.

Table 2 illustrates the impact locations and direction that may be detected by the passive safety controller 152 and transmitted to the active safety controller 158 for the system 250.

TABLE 2

| Impact Location (Zone) | Impact Direction |
| --- | --- |
| 102 | longitudinal, lateral |
| 104 | lateral |
| 106 | lateral |
| 108 | longitudinal, lateral |
| 110 | longitudinal, lateral |

The passive safety controller 152 transmits the impact location and direction to the active safety controller 158 in response to the first passive signal set and the second passive signal. The passive safety controller 152 transmits the impact location, the impact direction and the intensity level as the passive output signal. The active safety controller 158 may control the vehicle to a stabilized state after the vehicle 100 experiences an impact in response to the passive output signal.

FIG. 4 depicts the vehicle 100 having a system 350 for sensing the impact location and the direction of the vehicle impact in accordance to another embodiment of the present invention. In addition to the zones 102, 104, 106, 108 and 110 as discussed in connection with FIGS. 2-3, the vehicle 100 includes a zone 352 that corresponds to a rear section of the vehicle 100. One or more zones 102, 104, 106, 108, 110 and 352 may experience an impact from an oncoming object. The system 350 includes bi-axial accelerometers 254 positioned in zones 102 and 352. The system 350 also includes the pressure sensors 156 positioned in zones 104, 106 and the accelerometer sensors 154 positioned in zones 108, 110.

As noted in connection with FIG. 2, the passive safety sensor 154, 156 positioned in zones 104, 106, 108 and 110 are adapted to provide information related to the impact direction (e.g., lateral) as first and second passive signals. In reference to FIG. 4, the bi-axial accelerometers 254 positioned in zones 102 and 352 are adapted to provide information related to the impact direction (e.g., longitudinal or lateral) of the oncoming object as the first passive signal set.

Table 3 illustrates the impact location and direction that may be detected by the passive safety controller 152 and transmitted to the active safety controller 158 for the system 350.

TABLE 3

| Impact Location (Zone) | Impact Direction |
| --- | --- |
| 102 | longitudinal, lateral |
| 104 | lateral |
| 106 | lateral |
| 108 | lateral |
| 110 | lateral |
| 352 | longitudinal, lateral |

The passive safety controller 152 transmits the impact location and impact direction to the active safety controller 158 in response to the first passive signal (e.g., from zones 108 and 110), the first passive signal set (from zones 102 and 254) and the second passive signal (from zones 104 and 106). The passive safety controller 152 also transmits the intensity level of the impact. The passive safety controller 152 transmits the impact location, the impact direction and the intensity level as the passive output signal. The active safety controller 158 may control the vehicle to a stabilized state after the vehicle 100 has encountered an impact in response to the passive output signal.

In one example, the bi-axial sensors 254 as shown in connection with FIG. 4 may be replaced with uni-axial accelerometers 154. In such an example, the uni-axial accelerometers 154 in the front and rear of the vehicle (e.g., zones 112 and 254) may provide longitudinal directional information only.

FIG. 5 illustrates a method 400 for sensing vehicle impact and impact direction. In block 402, the passive safety controller 152 establishes threshold values which may need to be exceeded to detect an impact for the first and second passive signals, the first passive signal set and the reference signal.

In block 404, with respect to system 150, the accelerometer sensor 154 in zone 102 monitors for a front impact in the longitudinal direction. With respect to systems 250, 350; the bi-axial accelerometer sensor 254 in zone 102 monitors for a front impact in the longitudinal direction or for a front-angular impact having a large lateral acceleration component.

In block 406, with respect to system 150, the accelerometer sensor 154 in zone 102 detects a front impact in the longitudinal direction. The accelerometer sensor 154 measures the acceleration of the vehicle and transmits a measured acceleration value as the first passive signal to the passive safety controller 152. With respect to systems 250, 350, the bi-axial accelerometer 254 in zone 102 detects a front impact in the longitudinal direction or a front angular impact having a large lateral acceleration component and transmits measured acceleration values as the first passive signal set to the passive safety controller 152. In each system 150, 250, and 350, the passive safety controller 152 receives measured acceleration values with the accelerometer sensor 154' as the reference signal.

In block 408, with respect to system 150, the passive safety controller 152 compares the measured acceleration values from the accelerometer sensor 154 (in zone 102) and the accelerometer sensor 154' (at the passive safety controller 152) to the threshold values to minimize the possibility of false activations due to local impacts. With respect to systems 250, 350; the passive safety controller 152 compares the measured acceleration values from the bi-axial accelerometer 254 in zone 102 for the lateral and longitudinal directions and from the accelerometer sensor 154' to the threshold values for longitudinal and lateral directions to minimize the possibility of false activations due to local impacts.

In block 410, the passive safety controller 152 determines the impact direction and the intensity level. For example, the passive safety controller 152 compares the measured acceleration values from the accelerometer sensor 154 (in zone 102) and the measured acceleration values from the accelerometer sensor 154' (at the passive safety controller 152) (for the system 150) or the measured acceleration values from the bi-axial accelerometer 254 (at zone 102) (for the systems 250, 350) and the measured acceleration values from the accelerometer sensor 154' to predetermined acceleration values in a look up table (in the passive safety controller 152) to determine the intensity level. The passive safety controller 152 determines the input location in block 406 by monitoring the arrival time of passive safety signals or the passive safety signal set from zones 102, 104,106, 108, 110 and 352.

In block 412, with respect to systems 150, 250 and 350; the passive safety controller 152 cross-checks all of the measured acceleration values received by the accelerometer sensors 154 and/or 254 in zone 102, against measured acceleration values in zones 108, 110 and/or 352 to confirm the occurrence of an impact at zone 102.

In block 414, the passive safety controller 152 transmits the impact location, impact direction and intensity level as a multiplexed message over the multiplexed bus to the active safety controller 158. The passive safety controller 152 may deploy airbags after vehicle impact. In the event the passive safety controller 152 determines that the impact intensity is a light impact, the passive safety controller 152 may deploy a resettable passive restraint system. The resettable passive restraint system may include and not limited to a motorized seatbelt retractor and reversible knee bolsters. In general, with a light impact situation, the passive safety controller 152 may not deploy airbags, but may deploy the resettable passive restraint system. The active safety controller 158 may use the impact location, impact direction and intensity level to stabilize the vehicle post-impact even if the intensity level indicates that the vehicle sustained a light impact at zone 102. In general, the active safety controller 158 may detect vehicle impact. However, the active safety controller 158 may not have knowledge of the impact location direction and intensity level after vehicle impact. The active safety controller 158 may use the impact location direction and intensity level to stabilize the movement of the vehicle post impact.

In block 416, the pressure sensors 156 in zones 104, 106 monitors for a side impact event in the lateral direction.

In block 418, one or more of the pressure sensors 156 detects a side impact event and transmits measured pressure data as the second passive signal to the passive safety controller 152. The passive safety controller 152 determines impact location based on the second passive signal.

In block 420, the passive safety controller 152 assesses the measured pressure data.

In block 422, the passive safety controller 152 determines the impact location direction and the intensity level based on the measured pressure data. The passive safety controller 152 compares the measure pressure data to predetermine pressure values in the look up table which correspond to contact/collision conditions to determine the intensity level.

In block 412, the passive safety controller 152 cross checks the measured acceleration values from accelerometer sensors located at zones 102, 108, 110 and/or 352 to confirm the occurrence of an impact.

In block 414, the passive safety controller 152 transmits the impact location, impact direction and intensity level to the active safety controller 158. The passive safety controller 152 may deploy airbags and other safety related features of the restraint system. If the passive safety controller 152 determines that the intensity level corresponds to a light impact, the passive safety controller 152 may not deploy the airbags and may deploy a resettable restraint system. The active safety controller 158 may use the impact location, impact direction and intensity level to stabilize the vehicle post-impact.

In block 424, with respect to systems 150, 350, the accelerometer sensors 154 in zones 108, 110 monitors for a side impact in the lateral direction. With respect to system 250, the bi-axial accelerometer sensor 254 monitors for a side impact in the lateral direction or a side angular impact in the longitudinal direction.

In block 426, with reference to the systems 150 and 350; the accelerometer sensors 154 detects a side impact in the lateral direction. The accelerometer sensor 154 measures the acceleration of the vehicle and transmits a measured acceleration value based on the impact at zones 108 and/or 110 as the first passive signal to the passive safety controller 152. With respect to system 250; the bi-axial accelerometer sensor 254 detects a side impact in the lateral direction or a side angular impact in the longitudinal direction. The bi-axial accelerometer sensor 254 transmits measured acceleration values based on the impact at zones 108 and/or 110 as the first passive signal set to the passive safety controller 152.

In block 428, with respect to system 150, 350; the passive safety controller 152 compares the measured acceleration values from the accelerometer sensor 154 (in zones 108, 110) and the accelerometer sensor 154' (at the passive safety controller 152) to the threshold values to minimize the possibility of false activations due to local impacts. With respect to system 250; the passive safety controller 152 compares the measured acceleration values for the lateral and longitudinal directions of the impact in zone 108, 110 and at the passive safety controller 152 to the threshold values for longitudinal and lateral directions to minimize the possibility of false activations due to local impacts.

In block 430, the passive safety controller 152 determines the impact direction by monitoring the arrival time of the passive safety signals and the passive safety signal set from zones 102, 104,106, 108, 110 and 352.

The passive safety controller 152 compares the measured acceleration value at zones 108 and 110 (generated from the accelerometer sensor 154 for systems 150, 350) and at the location of the passive safety controller 152 (via the accelerometer sensor 154') or the measured acceleration values (generated from the bi-axial accelerometer 254) at zones 108 and 110 (for system 250) and at the location of the passive safety controller 152 (via the accelerometer sensor 154')to predetermined acceleration values in the look up table to determine the impact intensity level.

In block 412, with reference to systems 150, 350; the passive safety controller 152 cross-checks all of the measured acceleration values received by the accelerometer sensors 154 and/or 254 in zones 108 and 110 against measured acceleration values from zones 102 and/or 352 to confirm the occurrence of an impact.

In block 414, the passive safety controller 152 transmits the impact location, direction and intensity level as a multiplexed message over the multiplexed bus to the active safety controller 158. The passive safety controller 152 may deploy airbags after vehicle impact. In the event the passive safety controller 152 determines that the impact intensity is a light impact, the passive safety controller 152 may deploy the resettable passive restrain system. The active safety controller 158 may use the impact location, direction and intensity level to stabilize the vehicle post-impact, even if the intensity level indicates that the vehicle sustained a light impact at zones 108 or 110.

In block 432, with respect to system 350, the bi-axial accelerometer sensor 254 monitors for a rear impact in the longitudinal direction or for a rear angular impact having a large lateral acceleration component in zone 352.

In block 434, with respect to system 350, the bi-axial accelerometer sensor 254 detects a rear impact in the longitudinal direction or a rear angular impact having a large lateral acceleration component in zone 352. The bi-axial accelerometer sensor 254 measures the acceleration of the vehicle and transmits measured acceleration values based on the impact at zone 352 as the plurality of first passive signals to the passive safety controller 152.

In block 436, the passive safety controller 152 compares the measured acceleration values from the accelerometer sensor 254 (zone 352) and the accelerometer sensor 154' (located at the passive sensor controller 152) to the threshold values to minimize the possibility of false activations due to local impacts.

In block 438, the passive safety controller 152 determines the impact direction and the intensity level. For example, the passive safety controller 152 compares the measured acceleration values from zone 352 (via the bi-axial accelerometer sensor 254) and the measured acceleration values at the location of the passive safety controller 152 (via the accelerometer sensor 154') to predetermined acceleration values in the look up table to determine the impact direction and the intensity level.

In block 412, with respect to system 350, the passive safety controller 152 cross-checks all of the measured acceleration values received by the accelerometer sensors 154 and/or 254 in zone 352 against measured acceleration values in zones 102, 108 and 110 to confirm the occurrence of vehicle impact.

In block 414, the passive safety controller 152 transmits the impact location, impact direction and intensity level as a multiplexed message over the multiplexed bus to the active safety controller 158. In the event the passive safety controller 152 determines that the impact intensity is light, the passive safety controller 152 may deploy the resettable passive restraint system. The passive safety controller 152 may also deploy the resettable passive restraint system. The active safety controller 158 may use the impact location, impact direction and intensity level to stabilize the vehicle post-impact, even if the intensity level indicates that the vehicle sustained a light impact at zone 352.

While the best mode for carrying out the invention has been described in detail, those familiar with the art to which this invention relates will recognize various alternative designs and embodiments for practicing the invention as defined by the following claims.

What is claimed:

1. A system for providing post-impact signals in a vehicle, the vehicle includes at least one impact zone positioned in designated sections of the vehicle; the system comprising:
   at least one passive safety sensor positioned in each impact zone and adapted to detect vehicle impact with an oncoming object, the passive safety sensor is configured to generate at least one of a passive input signal and a passive input signal set;
   a passive safety controller having a reference passive safety sensor for generating a reference signal, the passive safety controller is adapted to:
      determine the impact location and direction based on which passive safety sensor in a particular impact zone first detects the vehicle impact and transmits the at least one of the passive input signal and the passive input signal set;
      determine impact intensity based on the reference signal and the at least one of the passive input signal and the passive input signal set; and
      transmit a passive output signal indicative of the impact intensity, impact direction and impact location; and
   an active controller adapted to stabilize the vehicle post-impact in response to the passive output signal.

2. The system of claim 1 wherein the active safety controller is adapted to stabilize the movement and direction of the vehicle during post-impact in response to the passive output signal.

3. The system of claim 1 wherein the passive safety sensors include at least one accelerometer, at least one bi-axial accelerometer and at least one pressure sensor.

4. The system of claim 3 wherein the accelerometer is positioned in at least one of a front section zone, a rear zone, a left rear passenger side zone and a right rear passenger side zone and is adapted to generate the passive input signal.

5. The system of claim 4 wherein the bi-axial accelerometer is positioned in at least one of the front zone, the left and right rear passenger side zones and the rear zone and is adapted to generate the passive input signal set.

6. The system of claim 3 wherein the one or more pressure sensors are positioned in a front driver section zone and a front passenger section zone and are adapted to generate measured pressure data.

7. The system of claim 5 wherein the bi-axial accelerometer provides the impact direction for the oncoming object in one or more of a longitudinal direction and a lateral direction for at least one of the front zone, the left and right rear passenger side zones and the rear zone.

8. The system of claim 1 wherein the passive safety controller includes a look up table having predetermined acceleration values which correspond to the impact location and intensity level for a given impact.

9. A method for providing post-impact signals in a vehicle, the vehicle includes at least one impact zone positioned in designated sections of the vehicle; the method comprising:
   positioning at least one passive safety sensor in each impact zone;
   detecting vehicle impact with an oncoming object with the passive safety sensor;
   generating at least one of a passive input signal and a passive input signal set;
   determining the location and direction of the impact based on which passive safety sensor in a particular impact zone first generates the at least one of the passive input signal and the passive input signal set during vehicle impact;
   generating a reference signal with a reference passive safety sensor;
   determining an impact intensity based on the reference passive signal and the at least one of the passive input signal and the passive input signal set;
   transmitting a passive output signal indicative of the impact intensity, the impact direction and the impact location; and
   stabilizing the vehicle post-impact in response to the passive output signal.

10. The method of claim 9 wherein stabilizing the vehicle post-impact in response to the passive output signal further comprises stabilizing the movement and direction of the vehicle during post-impact in response to the passive output signal.

11. The method of claim 9 wherein the passive safety sensors include at least one accelerometer, at least one bi-axial accelerometer and at least one pressure sensor.

12. The method of claim 11 wherein the accelerometer is positioned in at least one of a front section zone, a rear zone, a left rear passenger side zone and a right rear passenger side zone and is adapted to generate the passive input signal.

13. The method of claim 11 wherein the bi-axial accelerometer is positioned in at least one of the front zone, left rear passenger side zone, right rear passenger side zone and a rear zone and is adapted to generate the passive input signal set.

14. The method of claim 11 wherein the pressure sensor is positioned in a front driver section zone and a front passenger section zone and is adapted to generate measured pressure data.

15. The method of claim 12 wherein the bi-axial accelerometer provides the impact direction for the oncoming object in one or more of a longitudinal direction and a lateral direction for at least one of the front zone, the left and right rear passenger side zones and the rear zone.

16. A system for providing post-impact signals in a vehicle, the vehicle includes at least one impact zone positioned in designated sections of the vehicle, the system comprising:
   at least one passive safety sensor positioned in each impact zone and adapted to detect vehicle impact with an oncoming object, the passive safety sensor is configured to generate at least one of a passive input signal and a passive input signal set;
   a passive safety controller having a reference passive safety sensor for generating a reference signal, the passive safety controller is adapted to:
      determine the impact location and direction based on which passive safety sensor in a particular impact zone first detects the vehicle impact and transmits the at least one of the passive input signal and the passive input signal set;
      determine impact intensity based on the reference signal and the at least one of the passive input signal and the passive input signal set;
      transmit a passive output signal indicative of the impact intensity, impact direction and impact location; and
      deploy a resettable restraint system in response to determining that the impact intensity is a light impact; and
   an active safety controller adapted to stabilize the vehicle post-impact in response to the passive output signal.

17. The system of claim 16 wherein the resettable restraint system comprises motorized seatbelt retractors and reversible knee bolsters.

18. The system of claim 16 wherein the passive safety controller is further adapted to deploy the resettable restraint system in response to determining a light impact without deploying at least one airbag.

19. The system of claim 16 wherein the passive safety sensors include at least one accelerometer, at least one bi-axial accelerometer and at least one pressure sensor.

20. The system of claim 16 wherein the passive safety controller includes a look up table having predetermined acceleration values which correspond to an intensity level for a single impact.

* * * * *